United States Patent [19]

Katsuyama

[11] Patent Number: 4,860,104
[45] Date of Patent: Aug. 22, 1989

[54] NOISE ELIMINATING APPARATUS OF A VIDEO SIGNAL UTILIZING A RECURSIVE FILTER HAVING SPATIAL LOW PASS AND HIGH PASS FILTERS

[75] Inventor: Hitoshi Katsuyama, Tokorozawa, Japan

[73] Assignee: Pioneer Electronic Corporation, Tokyo, Japan

[21] Appl. No.: 209,929

[22] Filed: Jun. 22, 1988

[30] Foreign Application Priority Data

Oct. 26, 1987 [JP] Japan ................. 62-269761

[51] Int. Cl.⁴ ............................................. H04N 5/213
[52] U.S. Cl. ......................................... 358/167; 358/36
[58] Field of Search ............................... 358/167, 36

[56] References Cited

U.S. PATENT DOCUMENTS

| | | | |
|---|---|---|---|
| 4,064,530 | 12/1977 | Kaiser et al. | 358/167 X |
| 4,242,704 | 12/1980 | Ito et al. | 358/167 |
| 4,242,705 | 12/1980 | Ebihara | 358/167 |
| 4,268,855 | 5/1981 | Takahashi | 358/167 X |
| 4,291,333 | 9/1981 | Warnock et al. | 358/167 X |
| 4,296,436 | 10/1981 | Achiha | 358/167 |
| 4,485,403 | 11/1984 | Illetschko | 358/167 |
| 4,539,594 | 9/1985 | Illetschko | 358/167 |
| 4,549,213 | 10/1985 | Illetschko | 358/167 |
| 4,581,642 | 4/1986 | Poetsch et al. | 358/167 |
| 4,639,784 | 1/1987 | Fling | 358/167 |
| 4,646,138 | 2/1987 | Willis | 358/167 X |
| 4,652,907 | 3/1987 | Fling | 358/167 X |

Primary Examiner—James J. Groody
Assistant Examiner—E. Anne Faris
Attorney, Agent, or Firm—Foley & Lardner, Schwartz, Jeffery, Schwaab, Mack, Blumenthal & Evans

[57] ABSTRACT

In a noise eliminating apparatus including a recursive filter having a delay circuit to delay a video signal by only a predetermined period of time, each of recursive coefficients of a plurality of spatial frequency components included in the difference signal between the input video signal and the delayed video signal is changed in accordance with a movement detection output based on the difference signal. Thus, the dimming due to the motion of an image can be reduced to such a level that no visual problem occurs and the high frequency noises are also eliminated because of the correlation between the frames. Therefore, the dimming phenomenon due to the motion of the image in the moving portion can be reduced and the sufficient noise elimating effect can be obtained.

3 Claims, 3 Drawing Sheets

TIME FREQUENCY (Hz)

NOISE ELIMINATING APPARATUS OF A VIDEO SIGNAL UTILIZING A RECURSIVE FILTER HAVING SPATIAL LOW PASS AND HIGH PASS FILTERS

BACKGROUND OF THE INVENTION

1. Field of the Invention

The present invention relates to a noise eliminating apparatus for a video signal and, more particularly, to a noise eliminating apparatus which comprises a recursive digital filter using a frame memory and eliminates noise components contained in the video signal.

2. Description of the Related Background Art

The video signal is a signal in which image information is repeated at a frame period and the correlation between the frames is very strong. On the other hand, the noise components included in the video signal generally do not have the frame correlation. When, therefore, the video signal is averaged every frame period with respect to the time, the energy of the signal component hardly changes and only the energy of the noise components decreases. There is known a noise eliminating apparatus which has been made in consideration of such a fact. An example of a fundamental arrangement of the noise eliminating apparatus is shown in FIG. 1.

In FIG. 1, a video signal which is extracted from the broadcasting waves or obtained by reading out of a recording medium is digitized by an A/D (analog/digital) converter 1 and is supplied to a subtractor 2. A subtracted output of the subtractor 2 is multiplied with a recursive coefficient $\alpha$ by a multiplier 3 and is supplied to an adder 4. An added output from the adder 4 is directly converted into an analog signal by a D/A (digital/analog) converter 5 which is a video signal to be supplied to a succeeding stage. The added output from the adder 4 is also supplied to a frame memory 6 and the video data of one frame is stored therein, so that this output is delayed by only the period of time corresponding to one frame. The delayed video data are sequentially supplied to a chroma inverter 7, which inverts the chroma component on the basis of the phase inversion of the chroma component of each frame in the NTSC system so as to coincide the chroma phases of the neighboring frames. Thereafter, the resultant output signal is supplied to the other input terminal of each of the subtractor 2 and adder 4. In this manner, a recursive digital filter 8A using the frame memory is formed.

In the recursive digital filter 8A, the recursive coefficient $\alpha$ has a value within a range of $0 < \alpha \leq 1$. When $\alpha = 1$, the noise eliminating effect is not obtained and an input video signal $\alpha$ directly becomes an output video signal v. On the contrary, when $\alpha \approx 0$, a full feedback recursive digital filter is formed and the largest noise eliminating effect is derived. FIG. 2 shows an input/output gain characteristic graph of the recursive digital filter 8A when $\alpha = 0.5$. As being apparent from this graph, the recursive digital filter 8A has a band eliminator characteristic in the time direction (frame-to-frame direction) and can eliminate the noises in the hatched region in FIG. 2.

On the other hand, it is natural that an image represented by a video signal moves and the correlation between the neighboring frames of the video signal in this moving portion is small. Therefore, when $\alpha$ is set to a small value, if the motion components exist in the hatched region in FIG. 2 in the moving portion, the motion components are attenuated, so that what is called a dimming phenomenon occurs on the display screen due to the motion. To avoid such dimming phenomenon, there is provided a motion detector 9 to detect the motion of the image on the basis of a difference signal p between the neighboring frames as a subtracted output of the subtractor 2, thereby controlling the value of $\alpha$ in accordance with the level of the difference signal p. In the still image portion, by setting $\alpha$ to a small value, the noises can be eliminated. In the moving portion, by setting $\alpha$ to a large value, the dimming phenomenon can be suppressed.

However, in the conventional noise eliminating apparatus with the foregoing arrangement, the noise eliminating efficiency must be sacrificed in order to suppress the deterioration in picture quality resulted from the dimming phenomenon in the moving portion. Therefore, it is difficult to simultaneously perform sufficient noise eliminating functions while avoiding the dimming due to the motion. In other words, when $\alpha$ is set to a large value in the moving portion, the noise eliminating efficiency is sacrificed, causing a phenomenon such that the noise images or spots become conspicuous in the video signal.

SUMMARY OF THE INVENTION

The present invention is directed to solve the drawbacks in the conventional apparatus as mentioned above and it is an object of the invention to provide a noise eliminating apparatus for a video signal in which the dimming phenomenon in the case of a moving picture is reduced and that an adequate noise eliminating effect can be performed even in the moving picture.

According to the present invention, this object is accomplished by a noise eliminating apparatus for a video signal comprising a recursive digital filter having a delay unit for delaying the video signal for only a predetermined period of time, wherein the respective recursive coefficient for a plurality of spatial frequency components included in a difference signal between the input video signal and the delayed input video signal are changed on the basis of a motion detection output.

DETAILED DESCRIPTION OF THE PREFERRED EMBODIMENTS

An embodiment of the present invention will be described in detail hereinbelow while referring to the accompanying drawings.

Figure 1:
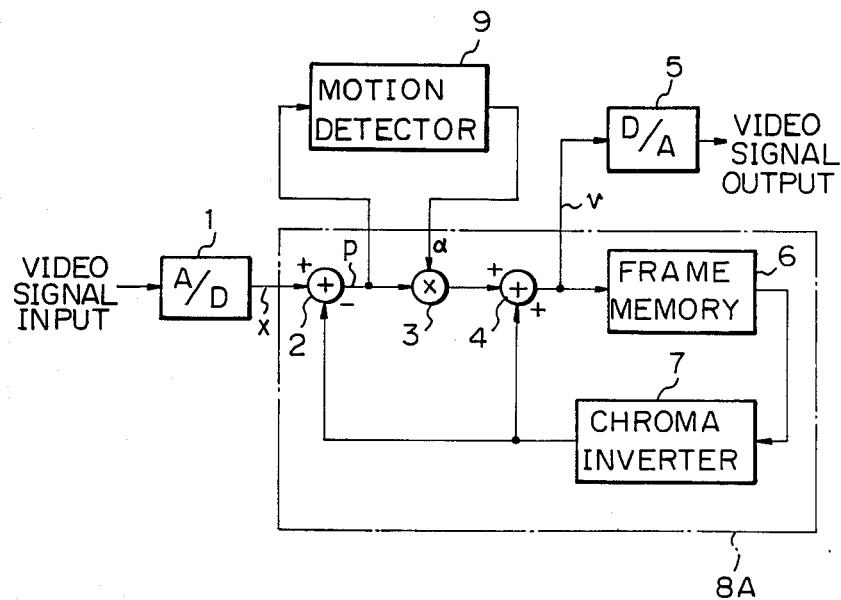
FIG. 1 is a block diagram showing an example of a fundamental arrangement of a hole eliminating apparatus.
Figure 3:
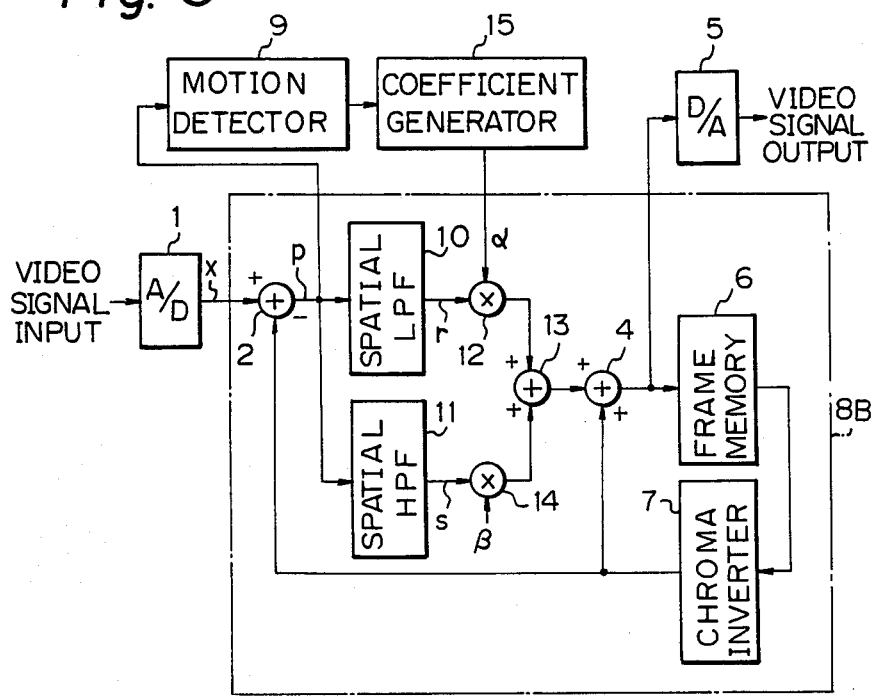
FIG. 3 is a block diagram showing an embodiment of a noise eliminating apparatus according to the present invention.
Figure 4:
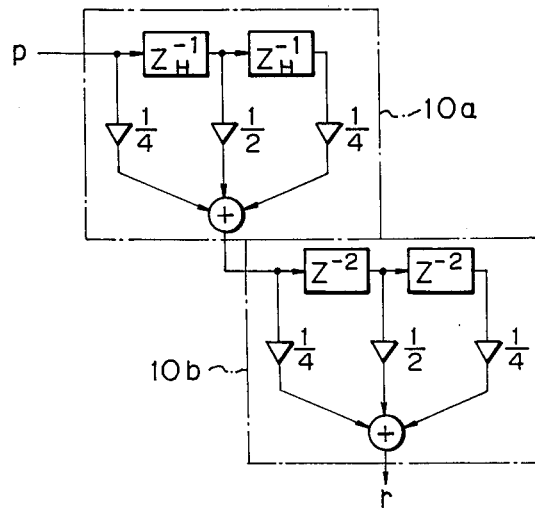
FIG. 4 is a block diagram showing an example of a circuit arrangement of a spatial LPF in FIG. 3.
Figure 5:
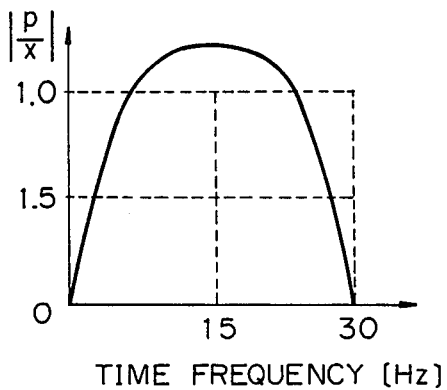
FIG. 5 is a charactertistic graph of a difference signal between the neighboring frames.

In FIG. 3, showing an embodiment of the present invention, the same or similar parts and components as those in FIG. 1 are designated by the same reference numerals. It is first to be understood that the recursive digital filter 8B differs from that in FIG. 1. In the recursive filter 8B, the difference signal p between the neighboring frames which is a recursive component is supplied to a spatial LPF (low pass filter) 10 and a spatial HPF (high pass filter) 11. FIG. 4 shows an example of a circuit arrangement of the spatial LPF 10. In the spatial LPF 10, the difference signal p first passes through a vertical LPF 10a and then passes through a horizontal LPF 10b, so that the low frequency spatial frequency components r are separated. In FIG. 4, a parameter $Z^{-1}$ corresponds to a delay equal to a horizontal line period (1H period) and a parameter $Z^{-2}$ corresponds to a delay equal to two sampling periods. The sampling frequency may be equal to 4 fsc (fsc: subcarrier frequency). The spatial HPF 11 has the characteristics opposite to the spatial LPF 10 and separates the high frequency spatial components s from the difference signal p. The spatial HPF 11 may include a spatial LPF and a subtractor producing an output representing a difference between the input and output of the spatial LPF. The low frequency spatial frequency components r separated by the spatial LPF 10 are multiplied with a coefficient $\alpha$ by a multiplier 12 and is then supplied to an adder 13. The high frequency spatial frequency components s separated by the spatial HPF 11 are multiplied with a coefficient $\beta$ by a multiplier 14 and is then supplied to the other input terminal of the adder 13.

Figure 2:
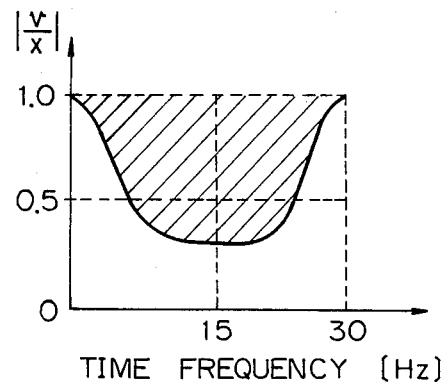
FIG. 2 is a diagram showing input/output characteristics of a recursive digital filter when $\alpha = 0.5$.

The coefficient $\alpha$ of the multiplier 12 is set by a coefficient generator 15 on the basis of a detection output of the motion detector 9. When a moving portion is determined by the motion detector 9, the coefficient $\alpha$ is set to a larger value such as 1. When the still image portion is detected, the coeffcient $\alpha$ is set to a smaller value such as 0.5. The high frequency spatial frequency components (the high frequency components in the vertical and horizontal direction) always circulate in the loop while being multiplied with the coefficient $\beta$ and have such characteristics as shown in FIG. 2 in the time direction (frame-to-frame direction). The component $\beta$ may be fixed to 0.5. The low frequency spatial frequency components are mixed to the high frequency spatial frequency components, while the former being multiplied with the coefficient $\alpha$ of the high value in the moving portion. In the still portion, the low frequency spatial frequency components are multiplied with the lower value thereby having such magnitudes as the characteristics shown in FIG. 2 and mixed with the high frequency spatial frequency components multiplied with the coefficient $\beta$. That is, the ratio of the low frequency spatial frequency components in the recursive components to the high frequency spatial frequency components is controlled on the basis of the motion detection output. In a manner similar to the case of the conventional apparatus, the motion detector 9 detects the motion of the picture on the basis of the difference signal p between the frames. The added output of the adder 13 is supplied as the recursive components to the adder 4.

Although the value of the coefficient $\alpha$ has been changed between the larger and smaller values in the above, it may be meaningful in some cases to change the value $\alpha$ in accordance with the detection output of the motion detector 9 in a manner similar to the case of the conventional apparatus shown in FIG. 1.

With the above-mentioned arrangement, when a still portion is determined by the motion detector 9, the coefficient $\alpha$ of the multiplier 12 is set to a lower value of the coefficient generator 15. Thus, the recursive digital filter 8B has the low pass filter characteristic in the time direction (frame-to-frame direction) as shown in FIG. 2 in a manner similar to the recursive digital filter 8A in FIG. 1 and can eliminate the noises in the hatched region in the diagram. On the other hand, if a moving portion is determined by the motion detector 9, the coefficient $\alpha$ of the multiplier 12 is set to the larger value such as 1, so that a larger amount of the low frequency spatial frequency components separated from the difference signal p are mixed to the high frequency spatial frequency components, which is multiplied with the fixed coefficient $\beta$ and do not circulate.

It is now apparent that in the moving portion, the low frequency spatial frequency components which play on important role is defining contours of a picture is kept without any substantial attenuation. Thus, the dimming due to the movements of the picture can be fairly avoided. In addition, since the noise components in the high frequency ranges in the vertical and horizontal directions which are particularly visually conscious are eliminated by using the correlation between the frames. Thus, a sufficient noise eliminating effect can be obtained in the moving portion.

Figure 6:
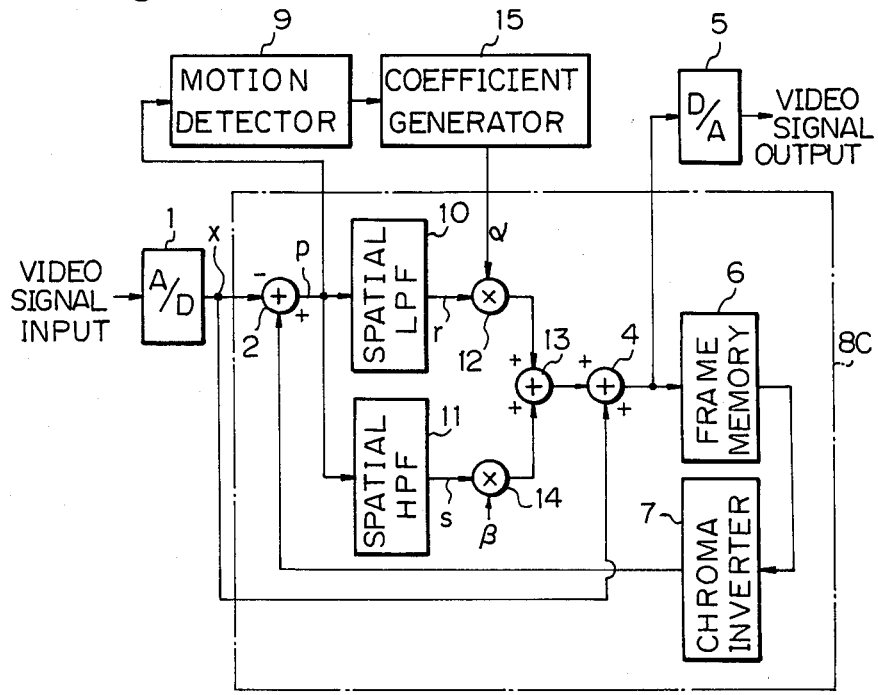
FIG. 6 is a block diagram showing another embodiment of a noise elminating apparatus according to the invention.

FIG. 6 shows another embodiment of the invention. In this embodiment, in a recursive filter 8C, a digital input video signal x is supplied to the other input terminal of the adder 4 and added to the recursive components which is the added output of the adder 13. In the still image portion, the coefficient $\alpha$ of a larger value such as 0.5 is multiplied to the low frequency spatial frequency components r included in the difference signal p which is obtained by subtracting the input video signal from the delayed video signal in the subtractor 2. On the other hand, in the moving portion, the coefficient $\alpha$ is set to a smaller value such as 0. According to this embodiment, in the still image portion, the recursive filter 8C is equivalent to the recursive filter 8A in FIG. 1 and has the low pass filter characteristic in the time direction as shown in FIG. 2. On the other hand, in the movement portion, the recursive coefficient $\beta$ is set to a smaller value, so that the low frequency spatial frequency components r circulate less. Consequently, the effect similar to that in the case of the foregoing embodiment is derived.

In each of the embodiments, the noise eliminating apparatus using the frame correlation has been described. However, the invention can be also applied to a noise eliminating apparatus using the field correlation. The similar effect can be derived even in the case of another arrangement in which one-field memory or two-frame memory is used as the frame memory 6.

On the other hand, the embodiments have been described while referring to the arrangements in each of which the ratio of the low frequency spatial frequency components in the recursive components to the high frequency spatial frequency components is controlled on the basis of the motion detection output. However, it is also possible to constitute in such a manner that the recursive components are divided into the low frequency, middle frequency, and high frequency spatial frequency components and the low frequency and middle frequency spatial components are mixed to the high frequency spatial frequency components at predetermined mixture ratios based on the motion detection output.

As described above, the respective recursive coefficients for a plurality of spatial frequency components included in the difference signal between the input video signal and the delay input video signal is regulated on the basis of the motion detection output. Thus, the dimming due to the motion in the picture can be reduced to such a level that no problem occurs visually and at the same time, the high frequency noises can be eliminated because of the correlation between the frames. Therefore, the dimming phenomenon due to the motion in the moving portion can be reduced and the sufficient noise eliminating effect can be also derived.

What is claimed is:

1. A noise eliminating apparatus which includes a recursive filter having delay means for delaying a video signal by a predetermined period of time to produce a delayed video signal and which eliminates noise components included in said video signal, said apparatus comprising:

a difference means for generating a difference signal between the video signal and the delayed video signal produced by said delaying means;

movement detecting means for detecting a movement of an image on the basis of said difference signal;

control means for regulating respective recursive coefficients for a plurality of spatial frequency components, included in said difference signal on the basis of a detection output of said movement detecting means;

said recursive filter including a spatial low pass filter and a spatial high pass filter for producing low frequency and high frequency components, respectively, of said difference signal as the plurality of spatial frequency components said low frequency components and said high frequency components being subsequently multiplied by said respective recursive coefficients, and said control means operative for varying the recursive coefficient corresponding to said low frequency components so as to decrease the proportion of said low frequency components in said plurality of spatial frequency components for the period of time when said movement detecting means detects the movement of the image, and said control means operative for keeping the recursive coefficient corresponding to the high frequency components at a constant value regardless of said movement detection.

2. A noise eliminating apparatus according to claim 1, wherein said delay means includes means for feeding back said delayed video signal to a summation means which adds the delayed video signal to a summation signal, said summation signal corresponding to a summation of said low frequency and high frequency components that have been multiplied by said respective recursive coefficients.

3. A noise eliminating apparatus according to claim 1, wherein said apparatus further comprises a means for feeding forward said video signal to a summation means for adding said video signal to a summation signal, said summation signal corresponding to the summation of the low frequency and high frequency components that have been multiplied by said recursive coefficients.

* * * * *